United States Patent
Gu

(10) Patent No.: US 9,059,654 B2
(45) Date of Patent: Jun. 16, 2015

(54) MOTOR DRIVING DEVICE, AND MOTOR CONTROL METHOD

(71) Applicant: SAMSUNG ELECTRO-MECHANICS CO., LTD., Suwon (KR)

(72) Inventor: Bon Young Gu, Suwon (KR)

(73) Assignee: SAMSUNG ELECTRO-MECHANICS CO., LTD., Suwon (KR)

(*) Notice: Subject to any disclaimer, the term of this patent is extended or adjusted under 35 U.S.C. 154(b) by 186 days.

(21) Appl. No.: 13/706,944

(22) Filed: Dec. 6, 2012

(65) Prior Publication Data

US 2014/0055071 A1    Feb. 27, 2014

(30) Foreign Application Priority Data

Aug. 22, 2012   (KR) .................. 10-2012-0091968

(51) Int. Cl.
*H02P 6/00* (2006.01)
*H02P 29/00* (2006.01)
*H02P 6/06* (2006.01)
*H02P 7/28* (2006.01)

(52) U.S. Cl.
CPC ...... *H02P 29/00* (2013.01); *H02P 6/06* (2013.01); *H02P 7/2805* (2013.01)

(58) Field of Classification Search
CPC ....................................................... H02P 29/00
USPC ............. 318/400.01, 400.06, 400.07, 400.09, 318/400.12, 400.14, 400.15, 400.38, 318/400.39, 400.4, 701, 715, 721, 727, 772, 318/779, 799, 800, 801, 807, 811, 257, 268, 318/266, 280, 286, 432, 437, 599; 388/819, 388/800

See application file for complete search history.

(56) References Cited

U.S. PATENT DOCUMENTS

| | | | |
|---|---|---|---|
| 5,844,395 A * | 12/1998 | Nakane | 318/721 |
| 6,335,603 B1 | 1/2002 | Otsuka et al. | |
| 6,400,116 B1 * | 6/2002 | Chen et al. | 318/599 |
| 6,580,235 B2 * | 6/2003 | Laurent | 318/400.1 |
| 7,564,204 B2 * | 7/2009 | Ogino et al. | 318/400.01 |
| 7,917,017 B2 * | 3/2011 | Kanamori | 388/811 |
| 2003/0011341 A1 * | 1/2003 | Janisiewicz et al. | 318/701 |
| 2008/0112695 A1 | 5/2008 | Kanamori | |

(Continued)

FOREIGN PATENT DOCUMENTS

| | | |
|---|---|---|
| JP | 62-213596 | 9/1987 |
| JP | 3-11397 | 2/1991 |
| JP | 9-84369 | 3/1997 |

(Continued)

OTHER PUBLICATIONS

Japanese Office Action mailed Dec. 10, 2013 in corresponding Japanese Application No. 2012-264617.

*Primary Examiner* — Antony M Paul

(57) ABSTRACT

There is provided a motor driving device including: a speed detection unit detecting a speed of a motor; a comparison unit comparing the speed of the motor detected by the speed detection unit with an external input speed; and a speed control unit outputting the reference speed as a control signal when the speed of the motor is equal to a reference speed or less and outputting a motor control signal generated based on a comparative value of the comparison unit when the speed of the motor exceeds the reference speed.

11 Claims, 4 Drawing Sheets

(56) References Cited

U.S. PATENT DOCUMENTS

2009/0167230 A1* 7/2009 Wu et al. .................. 318/504
2013/0154540 A1* 6/2013 Koo ........................... 318/721

FOREIGN PATENT DOCUMENTS

| JP | 10-257773 | 9/1998 |
| JP | 2001-145392 | 5/2001 |
| JP | 2002-325484 | 11/2002 |
| JP | 2007-209179 | 8/2007 |
| JP | 2008-148542 | 6/2008 |
| JP | 2010-259166 | 11/2010 |

* cited by examiner

MOTOR DRIVING DEVICE, AND MOTOR CONTROL METHOD

CROSS-REFERENCE TO RELATED APPLICATIONS

This application claims the priority of Korean Patent Application No. 10-2012-0091968 filed on Aug. 22, 2012, in the Korean Intellectual Property Office, the disclosure of which is incorporated herein by reference.

BACKGROUND OF THE INVENTION

1. Field of the Invention

The present invention relates to a motor driving device and a motor control method.

2. Description of the Related Art

Generally, in the case of a motor capable of controlling a speed such as a BLDC motor, the speed can be controlled by controlling a duty value of a pulse-width-modulation (PWM) signal. The duty value of the pulse-width-modulation signal may be determined according to a turn-on time when a signal has a high value and a turn-off time when a signal has a low value, within a single period, and a rotational speed of a motor may be in proportion to the duty value of the pulse-width-modulation signal.

A method for controlling a speed of a motor may be classified as an open loop control method and a closed loop control method. The open loop control method does not include a feedback circuit and therefore, may have a simple structure, but cannot compensate for errors occurring due to external factors such as electrical noise, a change in temperature, and the like. On the other hand, the closed loop control method includes a feedback circuit to detect the current revolutions per minute (RPM) and speed of the motor, the operation environment around the motor, and the like, and controls an input signal therefrom to control errors occurring at the time of the operation of the motor.

In the case of the closed loop control method, the speed of the motor is fedback, such that the motor can maintain a constant speed at all times, but when the speed of the motor is reduced by the external input signal, the motor stops due to overshoot.

RELATED ART DOCUMENT

Patent Laid-Open Publication No. 2007-209179
Japanese Patent Laid-Open Publication No. 2001-145392

SUMMARY OF THE INVENTION

An aspect of the present invention provides a motor driving device capable of preventing a motor from stopping due to overshoot occurring due to a feedback circuit when a duty ratio of an external input pulse-width-modulation signal is remarkably reduced, by previously setting a reference speed or a reference duty ratio to allow a speed control unit to compare a speed of a motor with the reference speed or compare a motor control signal generated by a feedback circuit with the reference duty ratio.

According to an aspect of the present invention, there is provided a motor driving device, including: a speed detection unit detecting a speed of a motor; a comparison unit comparing the speed of the motor detected by the speed detection unit with an external input speed; and a speed control unit outputting the reference speed as a control signal when the speed of the motor is equal to a reference speed or less and outputting a motor control signal generated based on a comparative value of the comparison unit when the speed of the motor exceeds the reference speed.

A rotational speed of the motor may be controlled according to the control signal output from the speed control unit.

The comparison unit may generate, as a comparative value, a difference between the speed of the motor detected by the speed detection unit and an external input speed.

According to another aspect of the present invention, there is provided a motor driving device, including: an external input signal detection unit detecting a duty ratio of an external input pulse-width-modulation (PWM) signal; a speed detection unit detecting a speed of a motor; a comparison unit comparing a speed corresponding to the duty ratio detected by the external input signal detection unit with the speed of the motor detected by the speed detection unit; and a speed control unit generating a motor control signal based on a comparative value of the comparison unit, wherein the speed control unit outputs the reference duty ratio as a control signal when the control signal generated based on the comparative value of the comparison unit is a reference duty ratio or less.

The speed control unit may output the control signal when the control signal generated based on the comparative value of the comparison unit exceeds the reference signal.

A rotational speed of the motor may be controlled according to the control signal output from the speed control unit.

The external input signal detection unit may sample the external input pulse-width-modulation signal and count the number of samplings in a single period of the external input pulse-width-modulation signal to detect the duty ratio.

The speed of the external input signal may be determined as being slow when the number of samplings in the single period of the external input pulse-width-modulation signal is reduced, and the speed of the external input signal may be determined as being fast when the number of samplings in the single period of the external input pulse-width-modulation signal is increased.

According to another aspect of the present invention, there is provided a motor control method, including: detecting a duty ratio by sampling an external input pulse-width-modulation signal; detecting a speed of a motor to compare the speed with a speed corresponding to the duty ratio of the external input pulse-width-modulation signal; generating a motor control signal from the compared results; and controlling the motor with a reference duty value when the generated motor control signal has a level equal to the reference duty value or a level less than the reference duty value and controlling the motor with the motor control signal when the generated motor control signal exceeds the reference duty value.

The speed of the external input signal may be determined as being slow when the number of samplings in a single period of the external input pulse-width-modulation signal is reduced, and the speed of the external input signal may be determined as being fast when the number of samplings in the single period of the external input pulse-width-modulation signal is increased.

According to another aspect of the present invention, there is provided a motor control method, including: detecting a speed of a motor; generating a reference signal as a motor control signal when the speed of the motor is equal to a reference speed or less; and controlling a rotation signal of the motor from the motor control signal.

The motor control method may further include: detecting an external input speed, wherein the rotational speed of the motor is controlled from the motor control signal generated by comparing the signal of the motor with the detected external input speed when the speed of the motor exceeds the reference speed.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE EMBODIMENTS

Figure 1:
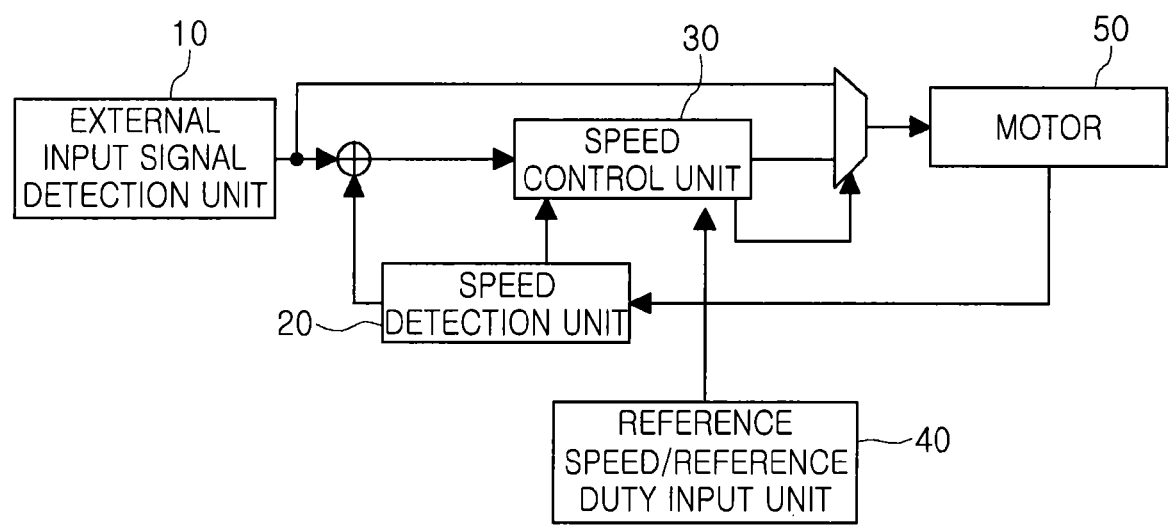
FIG. 1 is a block diagram schematically showing a motor control circuit according to an embodiment of the present invention.

Hereinafter, embodiments of the present invention will be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art.

In the drawings, the shapes and dimensions of elements may be exaggerated for clarity, and the same reference numerals will be used throughout to designate the same or like elements.

FIG. 1 is a block diagram schematically showing a motor control circuit according to an embodiment of the present invention.

Referring to FIG. 1, a motor driving device according to the embodiment of the present invention may include an external input signal detection unit 10, a speed detection unit 20, a speed control unit 30, a reference speed/reference duty input unit 40, and a motor 50. An operation of the motor is controlled according to a signal output from the speed control unit 30. For example, the speed control unit 30 may control a duty value of a pulse-width-modulation (PWM) signal to control a rotational speed of the motor 50, and the like. The motor 50, operated according to the signal output from the speed control unit 30, may be a brushless DC motor.

The external input signal detection unit 10 detects a signal generated from an outside of the motor driving device so as to change the rotational speed of the motor 50, wherein the signal may be the input pulse-width-modulation (PWM) signal. The duty ratio may be generated by sampling the input pulse-width-modulation signal and then, counting the number of samplings. That is, the duty ratio may be determined by measuring a ratio of time within which a high value is maintained for a single period of the input pulse-width-modulation signal. The speed of the motor 50 may be controlled by increasing the duty ratio in order to allow for the rotational speed of the motor 50 to be fast and by reducing the duty ratio in order to allow for the rotational speed of the motor 50 to be slow.

The rotational speed of the motor 50 can be detected by allowing the speed detection unit 20 to sample a signal received from the motor 50 and count the number of samplings. A difference between the speed of the motor 50 detected by the speed detection unit 20 and the duty ratio detected by the external input signal detection unit 10 is calculated and the calculated signal is input to the speed control unit 30.

The speed control unit 30 may generate a motor control signal from an input calculation signal to control the rotational speed of the motor 50. When the duty ratio detected by the external input signal detection unit 10 is larger than the speed of the motor detected by the speed detection unit 20, a control signal may be output so that the speed of the motor 50 is fast, and when the duty ratio detected by the external input signal detection unit 10 is lower than the speed of the motor detected by the speed detection unit 20, a control signal may be output so that the speed of the motor 50 is reduced. That is, the speed detection unit 20 and the speed control unit 30 may be configured as feedback circuits to constantly control the speed of the motor 50 according to a necessary speed.

The speed detection unit 20 may receive a reference speed or a reference duty ratio signal from the reference speed/reference duty input unit 40 in addition to the signal obtained by calculating the difference between the speed of the motor detected by the speed detection unit 20 and a speed corresponding to the duty ratio detected by the external input signal detection unit 10. When the speed of the motor detected by the speed detection unit 20 is equal to the reference speed or less, the speed control unit 30 outputs the reference speed signal and the motor 50 is controlled to be rotated at the reference speed output from the speed control unit 30. When the speed of the motor detected by the speed detection unit 20 exceeds the reference speed, the speed control unit 30 outputs the motor control signal according to a signal obtained by calculating the difference between the duty ratio detected by the external input signal detection unit 10 and the speed of the motor, and controls the rotation of the motor according to the motor control signal.

As described above, the speed control unit generates the motor control signal from the signal obtained by calculating the difference between the duty ratio of the external input signal and the speed of the motor detected by the speed detection unit, and when the motor control signal has a level equal to the reference duty ratio or a level less than the reference duty ratio generated from the reference speed/reference duty input unit 40, the speed control unit 30 outputs the reference duty ratio signal and controls the rotational speed of the motor according to the reference duty ratio signal. On the contrary, when the motor control signal exceeds the reference duty ratio, the speed control unit outputs the motor control signal and controls the rotational speed of the motor according to the motor control signal.

Figure 2:
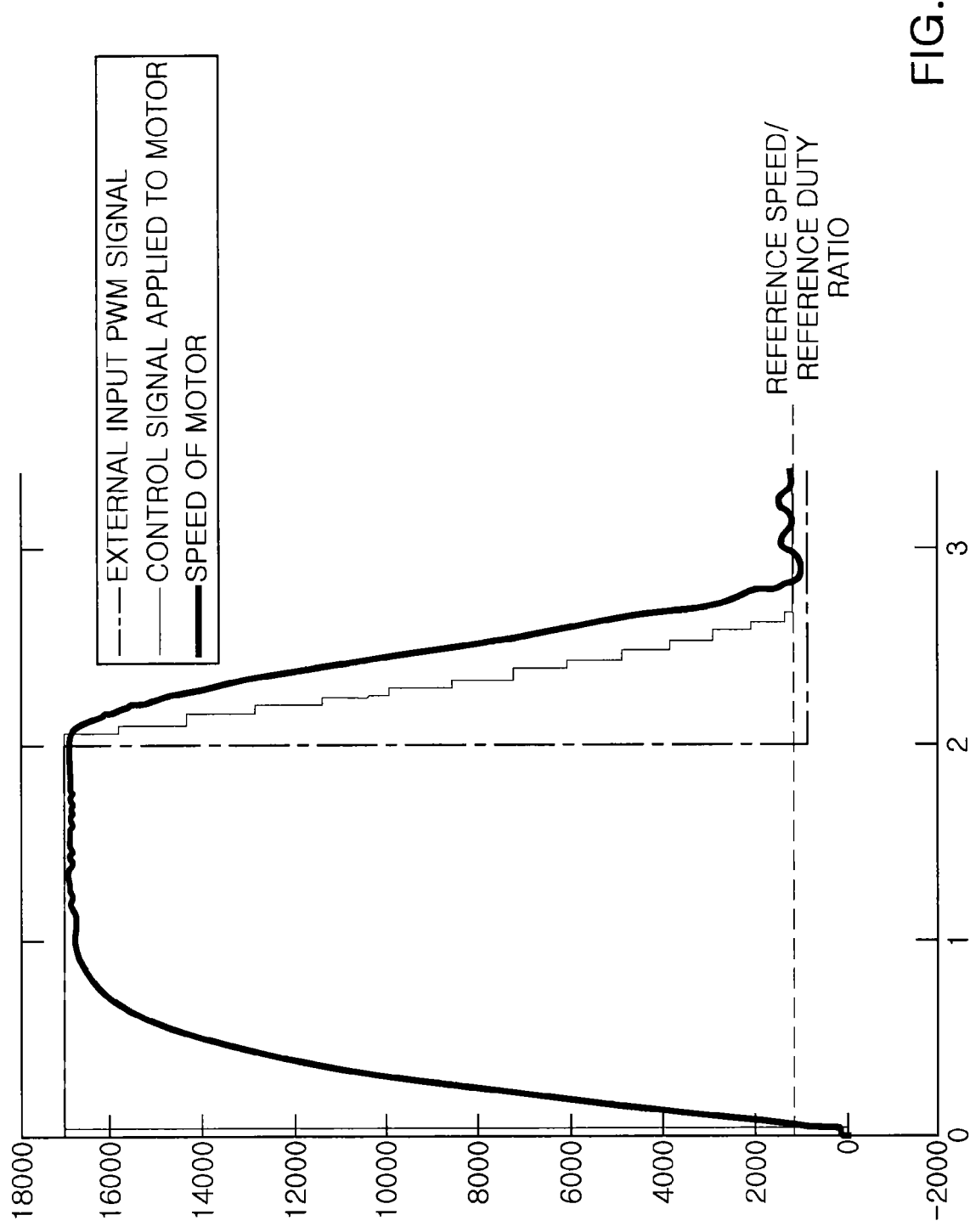
FIG. 2 is a graph provided for describing a motor driving method according to an embodiment of the present invention.

FIG. 2 is a graph provided for describing a motor driving method according to an embodiment of the present invention.

The driving of the motor controlled according to the reference speed or the reference duty ratio will be described with reference to FIG. 2. For example, when the motor receives the external input pulse-width-modulation signal so that the rotational speed of the motor is 17,000 rpm in the state in which the motor is in a stopped state, the speed of the motor is gradually increased by the feedback circuit according to the speed detection unit and the speed control unit. When there is no change in the external input pulse-width-modulation signal, the speed of the motor is maintained at 17,000 rpm.

When the external input pulse-width-modulation signal is input with a relatively low duty ratio, the motor control signal is generated to reduce the speed of the motor by the feedback circuit according to the speed detection unit and the speed control unit. The speed of the motor is gradually reduced and thus, the duty ratio of the motor control signal is also gradually reduced. In this case, the motor control signal is smaller than the speed of the motor at the same timing, and the duty ratio of the motor control signal is reduced as the feedback is repeated so as to reduce the speed of the motor larger than the duty ratio of the external input pulse-width-modulation signal. Therefore, the duty ratio of the motor control signal may be 0 before the speed of the motor reaches the duty ratio of the external input pulse-width-modulation signal. That is, even when the duty ratio of the external input pulse-width-modulation signal is not 0, the duty ratio of the motor control signal is 0 and thus, the motor may stop.

According to the embodiment of the present invention, when the duty ratio of the external input pulse-width-modulation signal is remarkably reduced by setting the reference speed or the reference duty ratio, the motor may be prevented from stopping. As the duty ratio of the external input pulse-width-modulation signal is reduced, the motor driving device gradually reduces the speed of the motor according to the feedback circuit configured to include the speed detection unit and the speed control unit, and when the signal of the motor detected by the speed detection unit is equal to the reference speed or less, the rotational speed of the motor is not controlled by the motor control signal generated by the feedback circuit and the rotational speed of the motor is controlled by the reference speed. That is, the motor may be prevented from stopping by controlling the motor with the reference speed before the duty ratio of the control signal applied to the motor is 0.

In addition, according to another embodiment of the present invention, when the duty ratio of the motor control signal exceeds the preset reference duty ratio by comparing the motor control signal generated by the feedback with the preset reference duty ratio, the motor control signal is applied to the motor and the motor control signal is again generated by the feedback. When the duty ratio of the motor control signal is equal to the preset reference duty ratio or less, the rotational speed of the motor is controlled with the reference duty ratio and the motor control signal is not applied to the motor until the motor control signal generated by the feedback exceeds the reference duty ratio.

Figure 3:
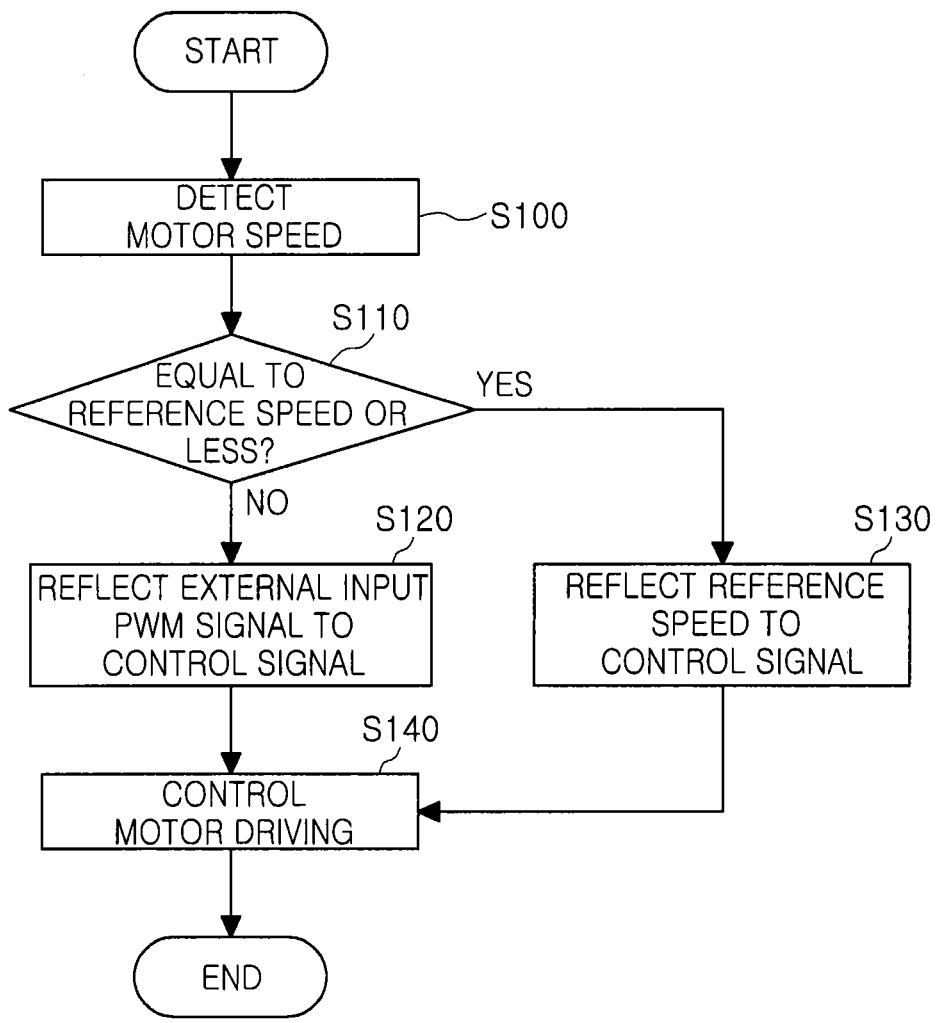
FIG. 3 is a flow chart provided for describing a motor driving method according to an embodiment of the present invention.

FIG. 3 is a flow chart provided for describing a motor driving method according to an embodiment of the present invention. Hereinafter, a flow chart of FIG. 3 will be described with reference to the embodiment of FIG. 1, but another embodiment in addition to FIG. 1 may be applied.

Referring to FIG. 3, a motor driving method according to the embodiment of the present invention starts with detecting the speed of the motor (S100). When the speed of the motor is reduced by reducing the duty ratio of the external input pulse-width-modulation signal, the rotational speed of the motor detected by the speed detection unit 20 is input to the speed control unit 30 and the reference speed from the reference speed/reference duty input unit 40 is input to the speed control unit 30.

When the speed control unit 30 compares the speed of the motor with the reference speed to determine that the speed of the motor exceeds the reference speed, the speed control unit 30 generates the motor control signal from the signal obtained by calculating the difference between the duty ratio of the external input pulse-width-modulation and the speed of the motor and outputs the generated motor control signal to the motor (S130). The rotational speed of the motor is controlled according to the motor control signal (S140).

Unlike this, when the speed of the motor is equal to the reference speed or less, the speed control unit 30 outputs the reference speed signal to the motor and controls the rotational speed of the motor according to the reference speed signal (S120 and S140). That is, when the speed of the motor is slow with the reduced duty ratio of the external input pulse-width-modulation signal, the motor is controlled by basically generating the motor control signal by the feedback, and when it is determined that the speed of the motor is equal to the reference speed or less, the driving of the motor may be controlled so as to maintain the reference speed. Therefore, the motor may be prevented from stopping due to the overshoot.

Figure 4:
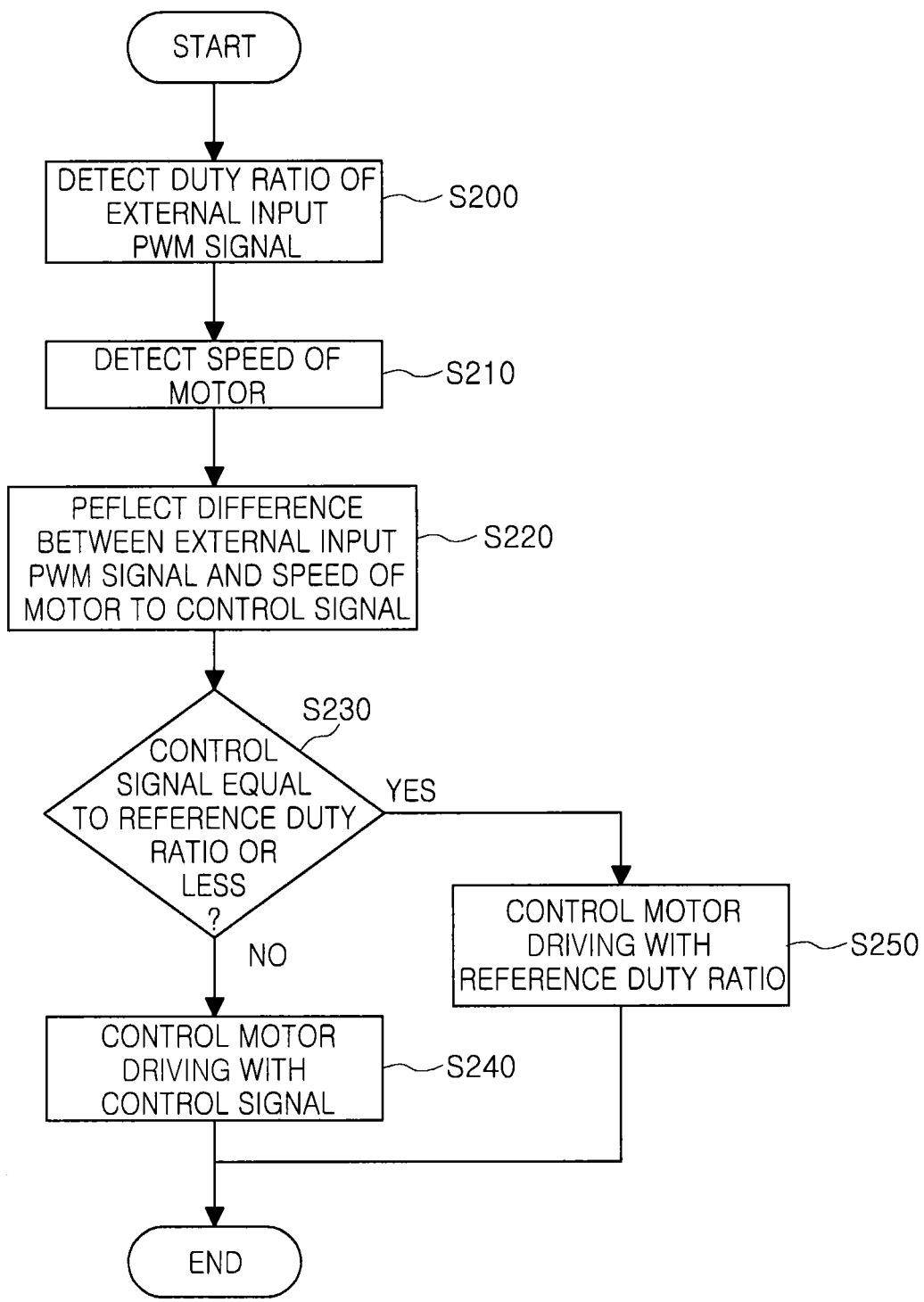
FIG. 4 is a flow chart provided for describing a motor driving method according to anther embodiment of the present invention.

FIG. 4 is a flow chart provided for describing a motor driving method according to another embodiment of the present invention. Hereinafter, a flow chart of FIG. 4 will be described with reference to the embodiment of FIG. 1, but another embodiment in addition to FIG. 1 may be applied.

Referring to FIG. 4, a motor driving method according to another embodiment of the present invention starts from the detection of the duty ratio of the external input pulse-width-modulation signal (S200). The duty ratio may be detected by sampling the external input pulse-width-modulation signal and counting the number of samplings. The speed detection unit 20 detects the rotational speed of the motor and calculates the difference between the duty ratio of the external input pulse-width-modulation signal and the rotational speed of the motor (S210).

The speed control unit 30 may receive the calculated signal to generate the motor control signal (S220). That is, the speed detection unit 20 and the speed control unit 30 may be configured as the feedback circuit to repeat the feedback process and generate the motor control signal. The speed control unit 30 receives the reference duty ratio from the reference speed/reference duty input unit 40 and compares the duty ratio with the motor control signal.

When the motor control signal is higher than the predetermined reference duty ratio, the motor control signal generated by the feedback is output from the speed control unit and the rotational speed of the motor may be controlled by the motor control signal (S250). When the motor control signal is equal to the predetermined reference duty ratio or less, the speed control unit 30 may output the predetermined reference duty ratio signal and control the rotational speed of the motor (S240). The speed control unit 30 continues to generate the motor control signal generated by the feedback, or when the duty ratio of the generated motor control signal has a level equal to the reference duty ratio or a level less than the reference duty ratio, the speed control unit 30 does not output the motor control signal to the motor.

Therefore, when the duty ratio of the external input pulse-width-modulation signal is remarkably reduced, the motor control signal having the duty ratio of 0 may be prevented from being output and the motor may be prevented from stopping due to the overshoot by controlling the motor according to the reference duty ratio.

As set forth above, the motor driving device according to the embodiments of the present invention can prevent the motor from stopping due to the overshoot occurring due to the feedback circuit when the duty ratio of the external input pulse-width-modulation signal is remarkably reduced, by previously setting the reference speed or the reference duty ratio to allow the speed control unit to compare the speed of the motor with the reference speed or compare the motor control signal generated by the feedback circuit with the reference duty ratio.

While the present invention has been shown and described in connection with the embodiments, it will be apparent to those skilled in the art that modifications and variations can be made without departing from the spirit and scope of the invention as defined by the appended claims.

What is claimed is:

1. A motor driving device, comprising:
   a speed detection unit detecting a speed of a motor;
   a comparison unit comparing the speed of the motor detected by the speed detection unit with an external input speed; and
   a speed control unit outputting the reference speed as a control signal when the speed of the motor is equal to a reference speed or less and outputting a motor control signal generated based on a comparative value of the comparison unit when the speed of the motor exceeds the reference speed.

2. The motor driving device of claim 1, wherein a rotational speed of the motor is controlled according to the control signal output from the speed control unit.

3. The motor driving device of claim 1, wherein the comparison unit generates, as a comparative value, a difference between the speed of the motor detected by the speed detection unit and an external input speed.

4. A motor driving device, comprising:
   an external input signal detection unit detecting a duty ratio of an external input pulse-width-modulation (PWM) signal;
   a speed detection unit detecting a speed of a motor;
   a comparison unit comparing a speed corresponding to the duty ratio detected by the external input signal detection unit with the speed of the motor detected by the speed detection unit; and
   a speed control unit generating a motor control signal based on a comparative value of the comparison unit,
   the speed control unit outputting the reference duty ratio as a control signal when the control signal generated based on the comparative value of the comparison unit is a reference duty ratio or less.

5. The motor driving device of claim 4, wherein the speed control unit outputs the control signal when the control signal generated based on the comparative value of the comparison unit exceeds the reference signal.

6. The motor driving device of claim 4, wherein a rotational speed of the motor is controlled according to the control signal output from the speed control unit.

7. The motor driving device of claim 4, wherein the external input signal detection unit samples the external input pulse-width-modulation signal and counts the number of samplings in a single period of the external input pulse-width-modulation signal to detect the duty ratio.

8. The motor driving device of claim 7, wherein the speed of the external input signal is determined as being slow when the number of samplings in the single period of the external input pulse-width-modulation signal is reduced, and the speed of the external input signal is determined as being fast when the number of samplings in the single period of the external input pulse-width-modulation signal is increased.

9. A motor control method, comprising:
   detecting a duty ratio by sampling an external input pulse-width-modulation signal;
   detecting a speed of a motor to compare the speed with a speed corresponding to the duty ratio of the external input pulse-width-modulation signal;
   generating a motor control signal from the compared results; and
   controlling the motor with a reference duty value when the generated motor control signal has a level equal to the reference duty value or a level less than the reference duty value, and controlling the motor with the motor control signal when the generated motor control signal exceeds the reference duty value.

10. The motor control method of claim 9, wherein the speed of the external input signal is determined as being slow when the number of samplings in a single period of the external input pulse-width-modulation signal is reduced, and the speed of the external input signal is determined as being fast when the number of samplings in the single period of the external input pulse-width-modulation signal is increased.

11. A motor control method, comprising:
   detecting a speed of a motor;
   generating a reference signal as a motor control signal when the speed of the motor is less than a reference speed;
   controlling a rotation speed of the motor from the motor control signal; and
   detecting an external input speed,
   wherein the rotational speed of the motor is controlled by the motor control signal generated by comparing the signal of the motor with the detected external input speed when the speed of the motor exceeds the reference speed.

* * * * *